United States Patent
Glover (10) Patent No.: US 10,853,319 B2
(45) Date of Patent: Dec. 1, 2020

(54) SYSTEM AND METHOD FOR DISPLAY OF DOCUMENT COMPARISONS ON A REMOTE DEVICE

(71) Applicant: Workshare Ltd., London (GB)

(72) Inventor: Robin Glover, Harwell (GB)

(73) Assignee: Workshare Ltd., London (GB)

( * ) Notice: Subject to any disclaimer, the term of this patent is extended or adjusted under 35 U.S.C. 154(b) by 0 days.

(21) Appl. No.: 16/014,234

(22) Filed: Jun. 21, 2018

(65) Prior Publication Data
US 2018/0300351 A1  Oct. 18, 2018

Related U.S. Application Data (63) Continuation-in-part of application No. 15/063,247, filed on Mar. 7, 2016, and a continuation-in-part of
(Continued)

(51) Int. Cl.
| | |
|---|---|
| G06F 40/194 | (2020.01) |
| G06F 16/16 | (2019.01) |
| G06F 40/14 | (2020.01) |
| G06F 16/18 | (2019.01) |
| H04L 29/06 | (2006.01) |

(Continued)

(52) U.S. Cl.
CPC ........ *G06F 16/168* (2019.01); *G06F 9/44526* (2013.01); *G06F 9/452* (2018.02); *G06F 16/1873* (2019.01); *G06F 16/93* (2019.01); *G06F 40/14* (2020.01); *G06F 40/169* (2020.01); *G06F 40/194* (2020.01); *H04L 67/34* (2013.01); *H04L 67/42* (2013.01)

(58) Field of Classification Search
CPC ........ G06F 17/30247; G06F 17/30047; G06F 17/30905; G06F 17/30011; G06F 17/30861; G06F 17/218; G06F 17/211; G06F 17/2211; G06F 17/2288
See application file for complete search history.

(56) References Cited

U.S. PATENT DOCUMENTS

| | | |
|---|---|---|
| 5,072,412 A | 12/1991 | Henderson |
| RE35,861 E | 7/1998 | Queen |

(Continued)

FOREIGN PATENT DOCUMENTS

| | | |
|---|---|---|
| JP | 2004265267 | 9/2004 |

OTHER PUBLICATIONS

Tsai, et al., "A Document Workspace for Collaboration and Annotation based on XML Technology", IEEE, 2000, pp. 165-172.
(Continued)

*Primary Examiner* — Ariel Mercado
(74) *Attorney, Agent, or Firm* — Nixon Peabody LLP (57) ABSTRACT

A system utilizing a remote, client device for displaying comparison of two versions of a document that utilizes a server to obtain two versions of the document and perform the comparison, and transmit back to the remote device a comparison output data in a format that utilizes an application operating on the remote device to display the comparison output result, where the remote device receives and utilizes static and dynamic resources to display the comparison output and permit a user operating the remote device to interact with the displayed comparison output.

29 Claims, 4 Drawing Sheets

Related U.S. Application Data application No. 13/830,023, filed on Mar. 14, 2013, and a continuation-in-part of application No. 13/306,798, filed on Nov. 29, 2011.

(60) Provisional application No. 62/523,554, filed on Jun. 22, 2017, provisional application No. 62/137,358, filed on Mar. 24, 2015, provisional application No. 62/129,957, filed on Mar. 8, 2015, provisional application No. 61/417,853, filed on Nov. 29, 2010, provisional application No. 61/417,869, filed on Nov. 29, 2010, provisional application No. 61/417,858, filed on Nov. 29, 2010, provisional application No. 61/417,855, filed on Nov. 29, 2010.

(51) Int. Cl.
*G06F 9/445* (2018.01)
*G06F 16/93* (2019.01)
*H04L 29/08* (2006.01)
*G06F 9/451* (2018.01)
*G06F 40/169* (2020.01)

(56) References Cited

U.S. PATENT DOCUMENTS

| | | |
|---|---|---|
| 5,787,444 A | 7/1998 | Gerken |
| 5,806,078 A | 9/1998 | Hug |
| 5,890,176 A | 3/1999 | Kish |
| 5,890,177 A | 3/1999 | Moody |
| 5,898,836 A | 4/1999 | Freivald |
| 6,029,175 A | 2/2000 | Chow et al. |
| 6,038,561 A | 3/2000 | Snyder et al. |
| 6,067,551 A | 5/2000 | Brown |
| 6,128,635 A | 10/2000 | Ikenko |
| 6,449,624 B1 | 9/2002 | Hammack |
| 6,560,620 B1 | 5/2003 | Ching |
| 6,596,030 B2 | 7/2003 | Ball |
| 6,658,626 B1 | 12/2003 | Aiken |
| 6,918,082 B1 | 7/2005 | Gross |
| 7,496,841 B2 | 2/2009 | Hadfield |
| 7,796,309 B2 | 9/2010 | Sadovsky |
| 7,818,678 B2 | 10/2010 | Massand |
| 7,895,166 B2 | 2/2011 | Foygel |
| 8,196,030 B1 | 6/2012 | Wang |
| 8,233,723 B2 | 7/2012 | Sundaresan |
| 8,286,085 B1 | 10/2012 | Denise |
| 8,473,847 B2 | 6/2013 | Glover |
| 8,620,872 B1 | 12/2013 | Killalea |
| 8,635,295 B2 | 1/2014 | Mulder |
| 8,797,603 B1 | 8/2014 | Dougherty et al. |
| 8,839,100 B1 | 9/2014 | Orofino, II |
| 9,098,500 B1 | 8/2015 | Asokan et al. |
| 9,311,624 B2 | 4/2016 | Diament et al. |
| 9,813,519 B2 | 11/2017 | Massand |
| 2002/0120648 A1 | 8/2002 | Ball |
| 2003/0112273 A1 | 6/2003 | Hadfield |
| 2003/0121008 A1 | 6/2003 | Tischer |
| 2003/0237047 A1 | 12/2003 | Borson |
| 2004/0128321 A1 | 7/2004 | Hamer |
| 2004/0261016 A1 | 12/2004 | Glass |
| 2005/0055337 A1 | 3/2005 | Bebo |
| 2005/0071755 A1 | 3/2005 | Harrington |
| 2005/0138540 A1* | 6/2005 | Baltus ............... G06F 17/2211 715/229 |
| 2005/0251738 A1 | 11/2005 | Hirano et al. |
| 2005/0256893 A1 | 11/2005 | Perry |
| 2005/0282533 A1 | 12/2005 | Draluk |
| 2006/0031428 A1 | 2/2006 | Wikman |
| 2006/0061777 A1* | 3/2006 | Duggan ............... G06F 40/169 358/1.1 |
| 2006/0218004 A1 | 9/2006 | Dworkin |
| 2007/0011211 A1 | 1/2007 | Reeves |
| 2007/0027830 A1 | 2/2007 | Slmons |
| 2007/0220068 A1 | 9/2007 | Thompson |
| 2007/0294612 A1 | 12/2007 | Drucker |
| 2008/0034282 A1 | 2/2008 | Zernik |
| 2008/0065668 A1 | 3/2008 | Spence |
| 2008/0177782 A1* | 7/2008 | Poston ............... G06F 40/197 |
| 2008/0219495 A1 | 9/2008 | Hulten |
| 2008/0275894 A1 | 11/2008 | Varone; Marco |
| 2008/0301193 A1 | 12/2008 | Massand |
| 2010/0174678 A1* | 7/2010 | Massand ............... G06F 40/18 707/610 |
| 2010/0241943 A1 | 9/2010 | Massand |
| 2010/0318530 A1 | 12/2010 | Massand |
| 2011/0173103 A1* | 7/2011 | Batra ............... G06F 17/30955 705/29 |
| 2011/0197121 A1 | 8/2011 | Kletter |
| 2011/0252310 A1 | 10/2011 | Rahaman |
| 2012/0016867 A1 | 1/2012 | Clemm |
| 2012/0030563 A1* | 2/2012 | Lemonik ............... G06F 17/248 715/255 |
| 2012/0117096 A1 | 5/2012 | Massand |
| 2012/0133989 A1 | 5/2012 | Glover |
| 2012/0151316 A1 | 6/2012 | Massand |
| 2013/0060799 A1 | 3/2013 | Massand |
| 2014/0115436 A1 | 4/2014 | Beaver |
| 2014/0136497 A1 | 5/2014 | Georgiev |
| 2014/0280336 A1 | 9/2014 | Glover |
| 2014/0281872 A1 | 9/2014 | Glover |

OTHER PUBLICATIONS

Wells et al., "Groupware & Collaboration Support", www.objs.com/survey/groupwar.htm, Aug. 30, 2001, 10 pages.

XP-002257904, "Workshare Debuts Synergy", 2003, 3 pages.

Londer, Olga and Coventry, Penelope. Step by Step Microsoft® SharePoint® Foundation 2010. Microsoft Press. ISBN: 978-0-7356-2726-0. Copyright © 2011 pp. 7, 11, 30, 113, 114, 120, 142, 187, 221.

Workshare Compare Service Administration Guide, © 2007. p. 1-25, published in 2007.

Workshare Compare Service Developers Guide, © 2007. p. 1-30, published in 2007.

"Workshare Launches Compare Service—First Web Services Version of Gold Standard Deltaview Document Comparison Tool", Workshare Press Release, Nov. 17, 2005.

Workshare Compare Service 1.1 XML Schema, Oct. 15, 2003 pp. 1-3.

Workshare DeltaServer Configuration Guide, © 2003 p. 1-24, published in 2003.

Workshare Compare Service Technical Quick Start Guide, © 2007 p. 1-10 published in 2007.

Workshare Ltd. Workshare Protect 4.5 Admin Guide, (c) 2006.

\* cited by examiner

SYSTEM AND METHOD FOR DISPLAY OF DOCUMENT COMPARISONS ON A REMOTE DEVICE

PRIORITY CLAIM

This is a utility application. This application is a non-provisional continuation of U.S. Prov. Pat. App. No. 62/523,554 filed on Jun. 22, 2017. This application is a continuation-in-part of U.S. patent application Ser. No. 15/063,247, filed on Mar. 27, 2016, which is a non-provisional of U.S. Pat. App. No. 62/137,358, filed on Mar. 24, 2015 and U.S. Pat. App. No. 62/129,957, filed on Mar. 8, 2015, and is a continuation-in-part of U.S. patent application Ser. No. 13/830,023, filed on Mar. 14, 2013 and a continuation-in-part of U.S. patent application Ser. No. 13/306,798, filed on Nov. 29, 2011 which is a non-provisional of U.S. Pat. App. No. 61/417,853, filed on Nov. 29, 2010, U.S. Pat. App. No. 61/417,869, filed on Nov. 29, 2010, U.S. Pat. App. No. 61/417,858, filed on Nov. 29, 2010 and U.S. Pat. App. No. 61/417,855, filed on Nov. 29, 2010; all of which are hereby incorporated by reference in their entireties for all that they teach.

FIELD OF INVENTION

The invention described here describes a solution with a server based component capable of performing document version comparisons and a user interface (UI) component process operating on the user's local computer capable of displaying those comparison results to the user in a locally operating computer process, which may be their web browser (or within any other application containing web browser type functionality). The server component is also capable of performing certain document processing support functions to enable the display of the comparison result to the user that cannot easily or reasonably be performed using client side code components (such as JAVASCRIPT) running in the web-browser.

BACKGROUND

The web browser is now a ubiquitous application across almost all computing devices capable of displaying content on a screen. After many years of gradual standardization, technologies such as HTML5 and JAVASCRIPT provide a framework that allows a consistent and rich user interface (UI) to a server based application to be displayed to users across a very wide range of devices without the need to write a separate version of the application for each type of device or operating system.

The comparison aspect of the server component in the invention may be carried out using server-side comparison software such as Workshare Compare Server™, which produce a standard redline document comparison output along with machine readable information about the changes found. In one embodiment, the output may be encoded in a format such as XML or JSON). The document processing support component of the server side software will then further process these outputs of the comparison to provide information that can be used on the client side to display the comparison to the user and permit navigation through the changes.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
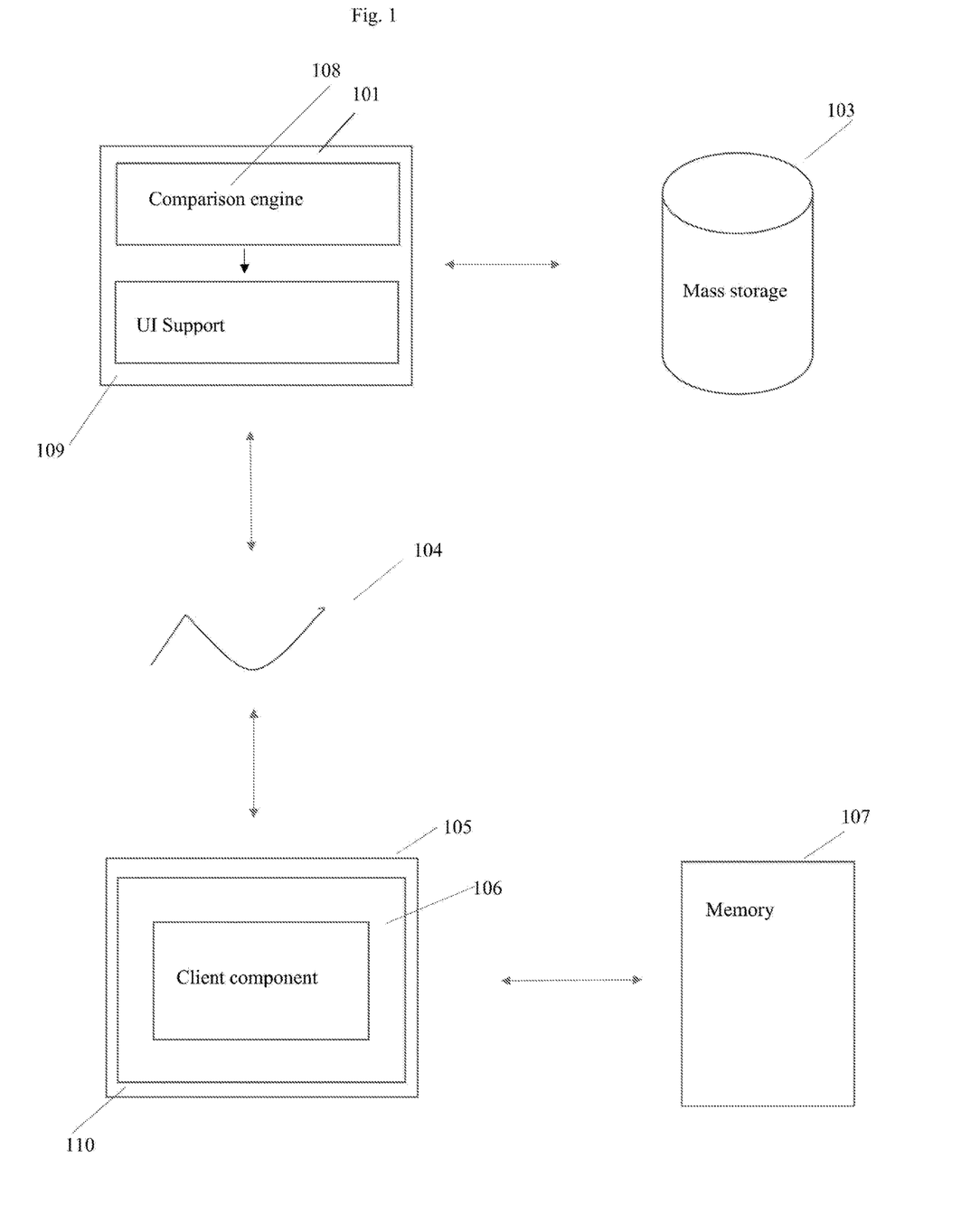
FIG. 1 shows the basic architecture of the invention.

The basic architecture of the system embodying the invention is shown in FIG. 1. A server (101) is operatively connected to a mass data storage device (103) and a network, typically the Internet (104). The server is comprised of a comparison engine (108) and a UI support component (109). The user's remote device (105) is also connected to the network (104) and is further comprised of data memory (107). The user's remote device is comprised of a display component (110), which preferably includes a web-browser program operating on the remote device. The web-browser program may express various components, including the client component (106), which in the preferred embodiment may be a JAVASCRIPT operating within the browser program memory space, or sandbox. In other embodiments, the display component (110) and client component (106) may be integrated into a stand-alone application running on the device.

The invention is comprised of a client side component and at least two server side components.

The server side components is comprised of the following components:

a comparison engine component (108) capable of comparing two word-processing documents and producing as output a redline document and change summary information A UI support component (109) that is capable of transforming the information created by the comparison component into data suitable for use by the UI component (106) operating on the client (105), remotely from the server (101).

In practice, these two logical components of the server may be combined into a single compound server component or split into two or more separate components running on the same or different server computers (using inter process communication) without affecting capability of the invention to perform its required purpose. In addition, an embodiment may combine the client component (106) and browser (110) into an application running on the client (105).

In the preferred embodiment, the client side component is written in browser based technologies such as HTML5 and JAVASCRIPT, although other technologies supported by web browsers may be used either now or in the future to achieve the same effect. Alternatively, the client component can be a stand alone application running on a remote device. In yet another embodiment, it may be a "plug in" program function that operates in combination with a browser.

Comparison Workflow

Figure 3:
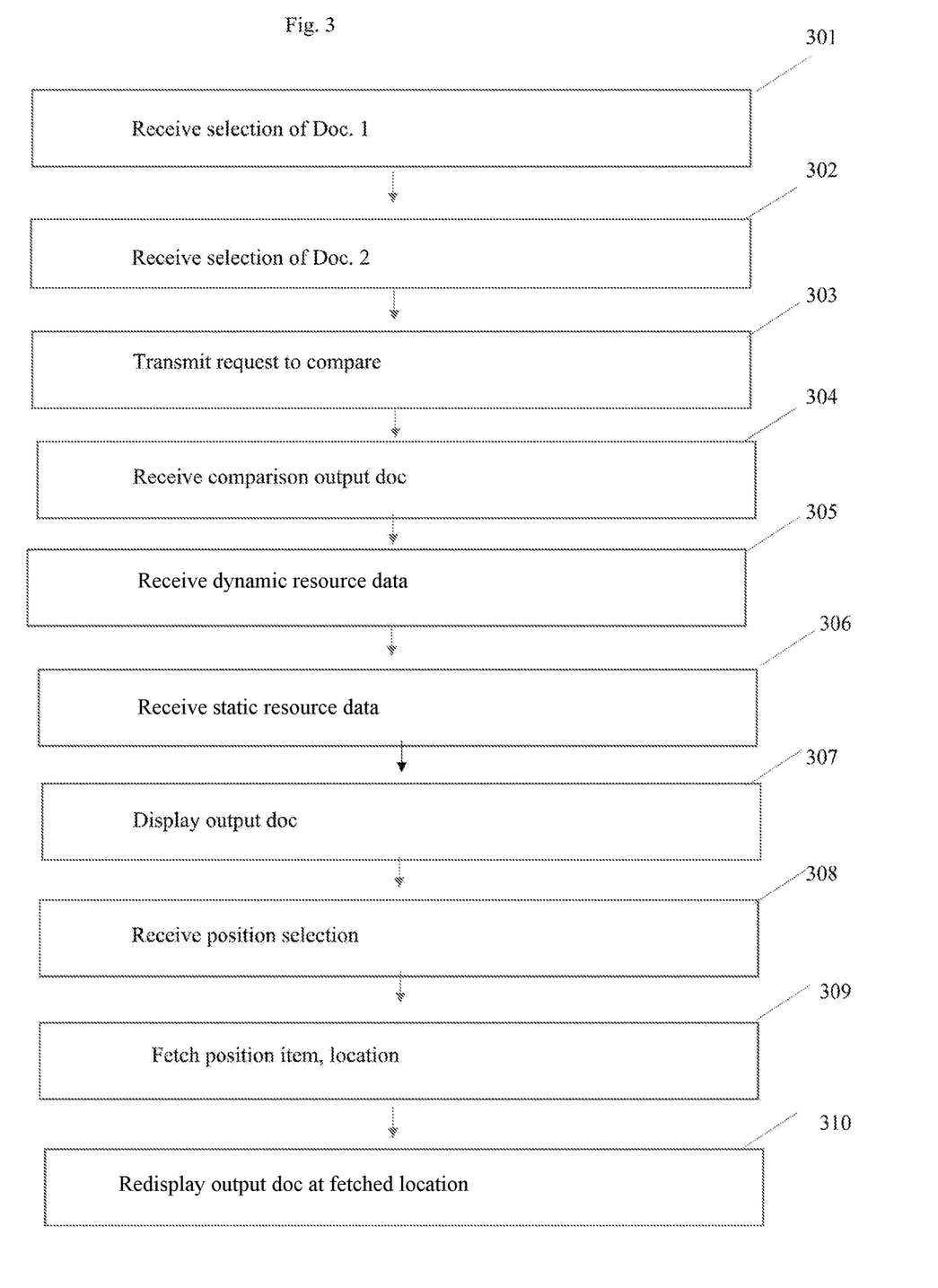
FIG. 3 shows the basic flowchart of the invention operating on the remote device or client side.

Requesting a Comparison:

The process of performing a comparison begins by the user requesting a comparison be performed by interacting with the UI presented by their web browser—this request could be performed in a number of ways, for instance:

- Selecting two files from their desktop in a comparison initiation web-page that forms part of the client side component of this invention (301), (302)
- Selecting two files from the internet by providing URL references to the files on a comparison initiation web-page that forms part of the client side component of this invention
- Selecting a document for comparison in a third party web page (for example a file storage site such as Google Drive® or DropBox® or a web interface to a document management system such as iManage Work10™ or NetDocuments®), then being transferred to a page on the UI component of the invention to select the second document for comparison
- Selecting two documents in a third party web page (examples given above)
- Selecting two versions of a document in a third-party web page that gives the user the ability to maintain a history of past versions of documents.

Whichever ways in which the user can select two documents (or two versions of a document for comparison) that will lead to the same step that a request to perform a comparison (303) is made by the client side to the comparison component operating on the server in one of the following ways:

- The content of the two documents to be compared are included in the body of the request (for instance as multi-part mime content)
- The locations of the two documents to be compared are included in the request so that the comparison component can retrieve the documents for comparison—for example the request may include two URLs that the server can use to retrieve the contents of the documents
- One document is provided as content in the body of the request and the other is provided as a location reference (ie URL)

In each case, care must be taken to identify the two documents so that they are given the correct role in the comparison to be performed—one must be identified as the original (older) version of the document and one as the modified (newer) version so that insertions and deletions in the comparison are shown correctly. This identification can be performed in a variety of ways, including naming or ordering of the parameters or included files. In an alternative embodiment, the comparison modules may utilize modification date and times of the two referenced documents to infer the older versus newer designations.

In an alternate embodiment, the URLs associated with the two documents may be input into the browser by operating a method that opens a dialogue box in the UI displayed by the browser. In one embodiment, the URL is input by the user by copying the text representing the URL and pasting the URL text into an input window in the dialogue box of the UI displayed by the browser. In another embodiment, selection may be made by the browser running a script as part of the UI that displays a dialogue box or other region where the user may drag and drop an icon representing a file from their computer user interface into that browser UI region. In another embodiment, the browser can operate a script that executes an API process with an external server system, that by means of the API process, submits authorization codes to access a location in the server system in order to obtain directory information and obtains a URL from the server system, where the URL points to the desired file. In some cases, the URL may also include a token or slug that contains authentication codes so that the target server system can authorize the request and deliver the file. In yet another embodiment, a JAVASCRIPT component may be downloaded from the server that sends the HTML page to the browser that includes a file open object. That file open object itself may operate a dialogue with the user that permits the user to browse for and select a file or input the URL in other ways.

Authentication of the file selection may be accomplished in several ways. In one embodiment, the script can fetch an authentication token from an authorized location on the user's computer that is transmitted to the file server and used by the file server to authenticate the file request. After authentication, the file server can return a URL and an authentication token that can be used by the comparison system to fetch the file. This can be transmitted directly to the comparison server or transmitted to the user's computer that then uploads it to the comparison server. When the comparison sever fetches the file, it will commence an HTTPS protocol transfer with the file server using the URL and the authentication token.

In another embodiment, the user may be prompted to input login identifiers and password to authorize the transaction with the file server. In this case, the UI may receive a list of files or directories from the file server's virtual root for that user, so that the user may navigate the desired file. The UI may display a list of files in the browser window UI. The user may input in the browser UI a selection of a file.

A file selection may be converted into a direct URL to that file server, directory and filename, or alternatively, a unique file identifier, that is turned into a URL by further calls to the API of the remote file server, where the URL can include the file identifier as a slug. That URL is the input that is transmitted to the comparison server as described.

Figure 2:
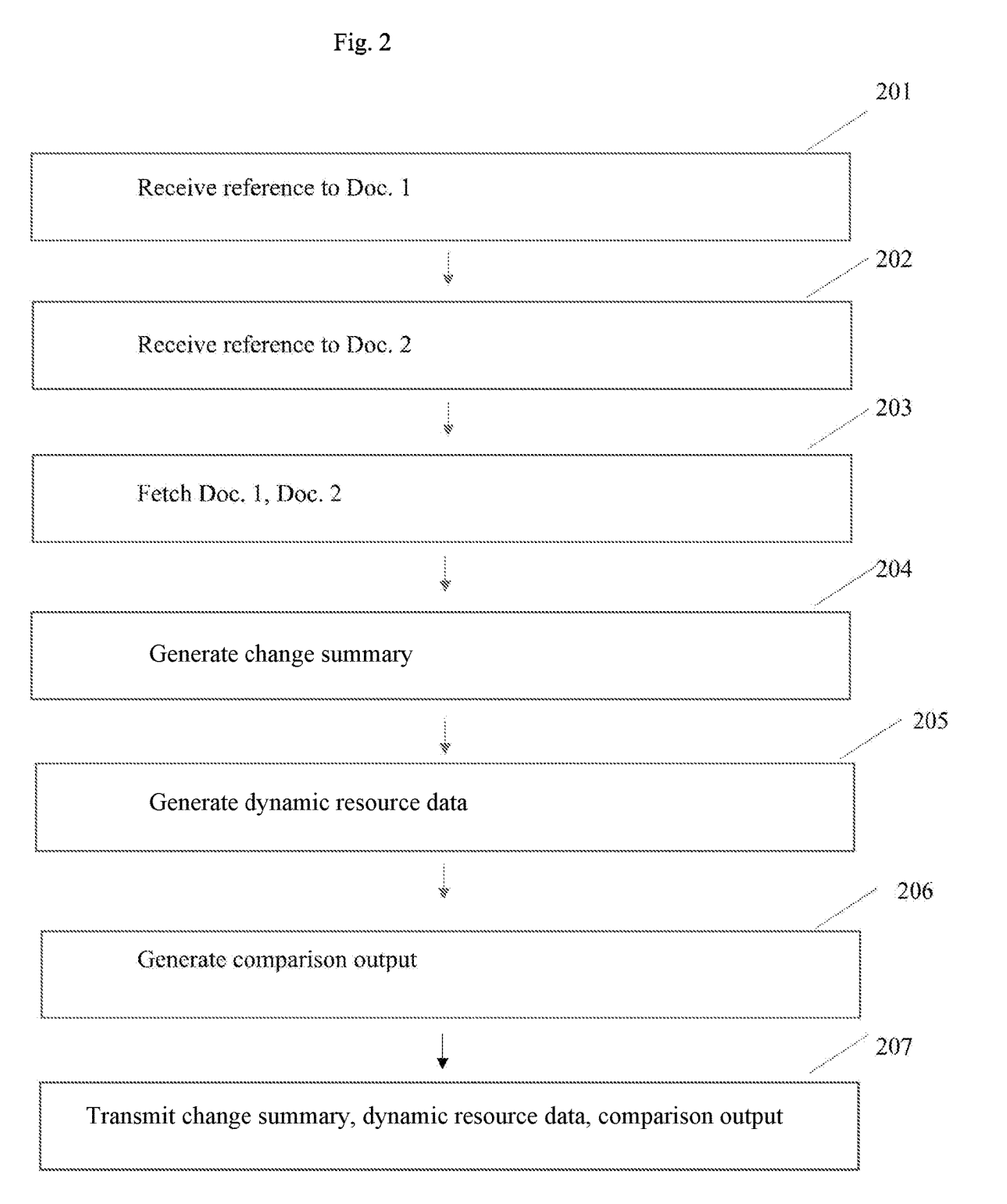
FIG. 2 shows the basic flowchart of the invention.

Performing a Comparison:

Upon receiving a request for a comparison to be performed, the comparison component (108) of the server software will perform the comparison to produce the comparison output. The steps to perform the comparison may include:

- Fetching source documents if their content was not included in the original request (202), (203).
- Converting the source documents to a suitable data format for content comparison
- Performing the comparison itself
- Creating a comparison output file, preferable a redline document (206)

Creating a summary of detected change in a machine readable format (204), (205)

Converting the comparison output file or redline document to a predetermined required output format (if requested by the user or required by the client components)

The details of the steps may vary for different comparison server applications, but the key inputs and outputs (two source documents as input and the output of a comparison document and a machine-readable change summary) are the same. It should be noted that it is possible for the two to be combined—i.e. the comparison document may also be used as a machine-readable change summary. This is technically possible as full detail on the changes may be present in the comparison document, but the complexity of parsing and processing word-processing document content means that this approach is not optimal.

The comparison output data file may be assigned an identifier, or comparison identifier or comparison ID (which may be a number or an alphanumeric string or in another form) and the comparison outputs are stored to a location that can be accessed by the UI support server component (103). The comparison source documents and other information about the comparison may also be stored to the same location to allow for later operations on the comparison (for instance swapping the order of the comparison, applying some or all of the changes suggested, etc). The storage location may be a folder or a directory on the server if both components of the server infrastructure are located on the same machine or may be a network storage folder or online file storage repository such as Amazon S3™ or Microsoft Azure Blob Storage™. The comparison ID can be used at a later point to recover the data files associated with a particular comparison from storage. In other embodiments, the data files may be stored on the mass storage device (103) and a database may contain a set of data tables that relate a comparison ID with the sources of the documents, and other comparison output data by means of file pointers.

Figure 4:
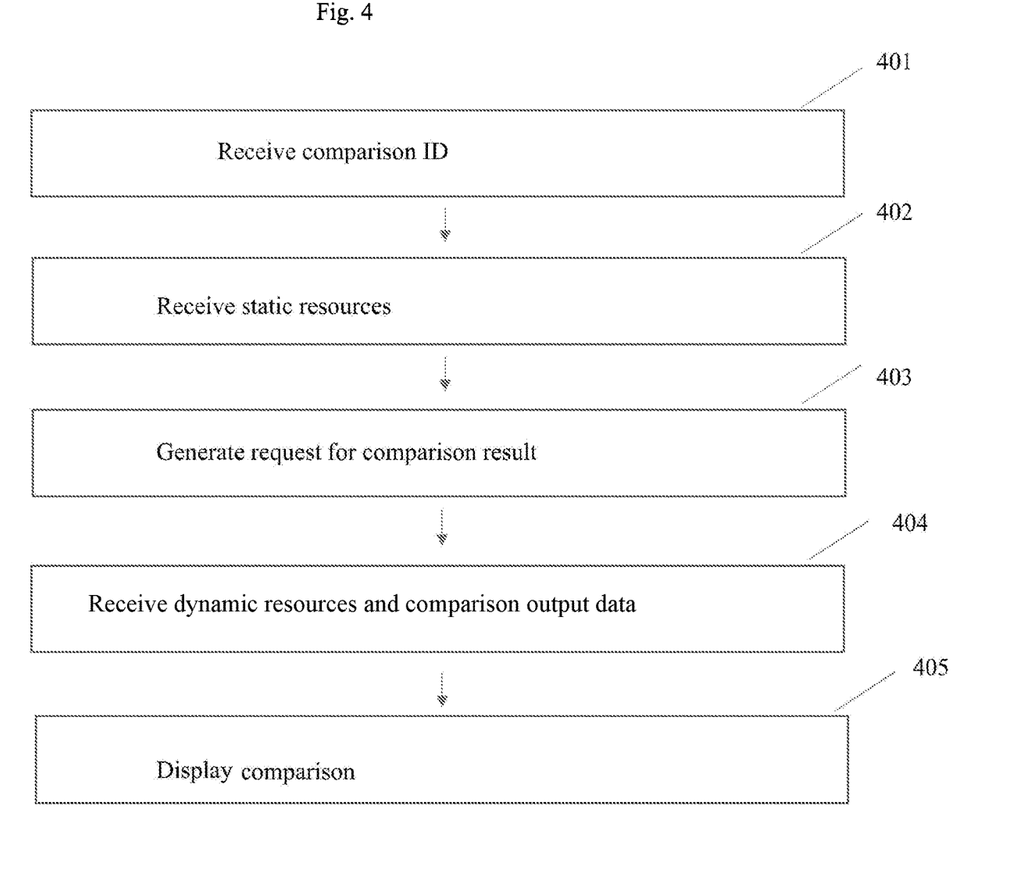
FIG. 4 shows the basic flowchart of the invention for requesting a comparison result from the server and displaying the result.

The client side code running in the user's browser (106) is sent the comparison identifier (ID) by the server component to enable it to display the result of the comparison (401). The ID may be returned in a variety of ways—for instance as an HTTP redirect response to cause the browser to navigate to a new URL, as an HTTP header such as the Location header which is designed to return the location of a newly created resource or in the body of a response (for example in XML or JSON) format.

An alternative flow would be to allow the server side comparison component to return an ID (401) to the client side code before or after the comparison is completed and to also provide a way for the client side code to poll or be notified by a data message that the comparison completed. Upon completion, the client side component can formulate a request transmitted to the server to obtain the comparison output data using the comparison ID.

Displaying the Comparison Result:

After the comparison is completed on the server side, the result is transmitted to the client side and displayed to the user in their browser (110) or application. Depending on how the result is returned to the browser, the transition to displaying the result might be achieved by navigating the browser to a new URL (one served by the UI support component of the server) either automatically due to an HTTP redirect response. In this embodiment, the server sends an HTTP redirect to the client and the browser code automatically goes to a new URL. Alternatively, the display is initiated via JAVASCRIPT running in the browser, and when that JAVASCRIPT gets a data message indicating that the comparison complete, then it generates a request for the comparison document, or by dynamically altering the browser UI using JAVASCRIPT code. These requests are for the static resources and the dynamic resources in order to get the browser to display the comparison.

Request for comparison is a different stage from delivery and displaying the results of that comparison. Any external party can submit to the server a request to compare two documents or document versions. In its most bare form, that would be an HTTP request that includes at least two URL's for the documents being compared. In this way, the server is acting as a comparison service. The server then can transmit a data message indicating the comparison is complete, and that can include unique identifier, in the form of an alphanumeric string, that identifies the comparison output. This may be in the form of a URL. The browser, if it redisplays with the received URL, the browser will display the comparison.

First, the browser gets the HTML and loads it, HTML contains the script or references to it, and then the script can obtain the comparison identifier from the request, and submit a request for that result. The server then transmits the comparison data referenced by the identifier in response. The JAVASCRIPT receives this data and then executes the display functionality to render the comparison output on the browser window.

When the browser displays the received URL, it downloads the static resources (402), which includes the HTML and a JAVASCRIPT that then calls for and downloads the dynamic resources specific to that comparison. The comparison ID (401) can be utilized either by integrating into the URL that references the comparison or by returning the ID to the client component so that the client component can make a request (403) using that comparison ID to make an inter-process communication protocol that relies on data messaging to request the specific comparison output data from the server.

Static resources (402) to control the display of the comparison in the browser (for example an HTML framework in which the comparison is displayed, JAVASCRIPT code that fetches and displays objects, CSS or other style sheet data) may be downloaded from the UI support server component or another web server. These resources are the same for all comparisons being displayed. Scripts may be code that is interpreted by an application, preferably a browser, operating on the client device.

Dynamic resources (resources that are specific to a particular comparison) are also downloaded to the browser from the UI support server component (404). These would be an image of a page, or a list of changes in the comparison, or sections of document text showing the comparison, positions of changes, parts of the document in HTML or PDF or other formatting. The client sends the comparison identifier (ID) as part of the request (403) for each dynamic resource to ensure that the information for the correct comparison is returned (404). Dynamic resources include any of the data that is specific to the comparison that was performed, and thereby, are not static resources relied on by the client component for displaying any comparison output.

Once the static resources are obtained by the client component, the dynamic resources may be obtained by the client component in order to fully display the comparison output. (405). In an alternative embodiment, the static resources may be downloaded into the client device for general use for all comparisons that are to be presented. In one case, it may be a plug-in installed into an Internet browser program. In another, it may be an enhancement to a word processing application running on the client device. In yet another embodiment, the static resources, dynamic resources and the comparison output data may be combined into one data file, preferably a hypertext document, and then the data extracted from the file on the client side to present the functionality to the user.

The following dynamic resources and corresponding responses from the UI support server component form parts of the display of the comparison in the browser:

The client side component will request a rendition of all or part of the comparison document in a format that can be displayed by the browser. This format might be an image (for example in PNG or JPG format), HTML content, PDF content or other formats that can be rendered by the browser. In some cases there may also be sub-resources that are required (for instance images, fonts or CSS information if using HTML format). These may be either embedded into the main response by the UI support server component or served by the same server component in response to separate sub-requests.

The client side component may request information about the positions of one or more changes within the document (the position being defined relative to the layout of the rendition of all or parts of the document mentioned above). A position in a comparison output document can have a data representation that embodies sufficient information that the client component can use it to locate its associated document change within the rendered document comparison output that is being displayed in the browser window. For each document change in the comparison output, there may be a unique Change Identifier (Change ID). Each Change ID is associated with at least one Position data item. An exemplary data structure encoding a change in the comparison output is presented:

ChangeID[PositionNum(1) . . . PositionNum(n), Change Category(1) . . . Change Category(n), Change Type, data, pointer to file, prior text, following text]

Examples of position data corresponding to a document change in the comparison output include in combination: a page number and the vertices of a rectangle within the document page where the change occurs. An example data structure encoding the position data may appear as follows:

PositionNum[PageNum, X, Y, W, H, ChangeID, Index]

Other position data that could be used to indicate location in the comparison output can include line numbers, paragraph numbers, pixel coordinates, vertices or other parameters defining geometric shapes or combinations thereof. In the example provided, X, Y represent the location of one corner of a rectangle and W, H its dimensions.

In another embodiment, a change in the document, that has a Change ID, may be associated with more than one Position data, because the change involves two or more locations. For example, one case would be text changes that cross page boundaries. Another is moved text, header and footer changes, footnotes and other references. A category may be a broader description of the purpose of the change to the alphanumeric text or other elements of the document, while the type is the specific modification of that data to implement that change. In this way, a "spelling correction" is a category of change, but to implement it, may require the operation of types of changes to the text, for example, either "replacement" of text or a "deletion" followed by an "insertion." This distinction is useful for filtering the display of changes to the document such that a user can avoid having spelling corrections or formatting changes displayed.

This allows the client side component to associate particular areas of the rendered comparison document with individual changes, to provide navigation (go to next change/previous change) to move through the document seeing just the changes without the need for the user to scroll manually past every page of the document and other functionality. Each change position will be associated with a change identifier ID identifying the change within the comparison. The user operating the client device can input a command that moves the display from one change in the comparison output to the next, or to the previous. Alternatively, the user can input an identifier that results in the display moving to the location of the associated Change ID.

In the preferred embodiment, the list of Position items is stored in a data structure, or a file. In the preferred embodiment, the Position items are sorted to be in the order of their occurrence in the document, for example, in reading order. A data structure containing the Position items is created and stored either on the client or the server, although in the preferred embodiment, the data structure comprised of the Position items is stored on the client as a JAVASCRIPT object and may be sorted as described above. Each Position item in the sorted list may also be comprised of an index number.

The client side component may request summary information describing the detected document changes in the comparison output, the summary information consisting of some or all of information regarding the text or other content forming each change, the type of change (insertion, deletion, move, etc), unchanged text adjacent to changes, ordering information (specifying the order of changes within the document), a change ID (allowing changes in the summary to be linked to the change positions). Optionally, each change may be associated with a category (for instance 'Spelling Corrections', 'Punctuation Changes', 'Whitespace Changes' and other categories of change type).

In one embodiment, the server can create a data set or file for at least one change categories that lists all of the changes that fall into that specified change category. In other embodiment, each change would have a list of one or more categories that it falls into. For example, a spelling repair of an item in the header of a document could be specified as having two change categories, "header" and "spelling." A change may fall into one or more categories at the same time (header, spelling), yet will also be one type of change (text replacement).

In yet another embodiment, the invention organizes the comparison output data that is transmitted from the server to the client in an efficient way. In this embodiment, the data that would be in a position list is embedded in the HTML. For example, in HTML there may be a "span" element, and if that element represents an insertion, then put attributes on the span, like a class, so, for example, a class is assigned: class=change 7,;; As a result, instead of specifying a coordinate box with an actual position in the document, the text elements comprising the output has associated tags in the HTML that these represent the type of change associated with that element and the JAVASCRIPT running in the browser highlights the changes when displaying that text element. Other visual indications may be used for different types of change. For example, text insertions may be treated with an underline and deletions with a strike-through.

In this case, the position is implicit, in that the "X, Y" location is not relevant, rather its "these HTML elements constitute a change." For example, imagine a deletion:

<p class="change change17 deletion"> text of deletion </p>

So this is an example of a deletion, it's the 17th change, it's a deletion, and the deleted text is provided. The JAVASCRIPT can then display the "text of the deletion" with whatever formatting is associated with "change" of type "deletion", for example, with cross-through text.

Here is an example of an insertion:

<p class="change change17 insertion"> text of insertion </p>
<Span class="change change18 insertion">text<span/>

As a result, the invention may be implemented using either a position list, whether as a separate data file or payload or data structure transmitted to the client or, the change element information is integrated into the HTML view of the comparison output, where the "position" is now implicit because where the this entry is inserted into the HTML is the position of the change.

An alternative implementation would include the change summary and positional information as the response to a single request for information from the client side code to the server. In either embodiment, the server can generate a list of changes, or in response to a query from the client component specifying a change category, a list of changes whose change category is of a specified value. The determined list of changes and corresponding position data is transmitted to the client component. In this way, a client component may navigate from one change to the next for a specified category of changes without re-computing any location data. In yet another embodiment, all of the changes and corresponding position data are transmitted to the client component. In this embodiment, the client component can navigate from one position to the next position whose change category matches a selected input by skipping any position items whose change category do not match. The code operating on the client device can receive selection data from the user in the form of selecting specific categories of changes, or types of changes in order to operate such selective navigation.

Given the information received by the client side code in response to the above requests, the user can experience the following features in their browser:

Viewing the content of the comparison document by scrolling through the pages of the document.

Moving from one change to the next in or previous in document order by using 'Next Change' and 'Previous Change' buttons. These buttons may be displayed in the browser window by utilizing scripts. Upon detecting a selection of a button, the script can then redisplay the page utilizing the next or previous indexed change in the document. The client component displaying the comparison document has a register that stores the current displayed position of the document. When the client component receives from the user an indication to move to the "next" change in the document, it then searches through the data structure stored in memory (107) containing the Position items to locate a Position item whose location data is after the stored current displayed position by the smallest amount as compared to the other Position item locations. In this embodiment the Position items do not need to be sorted in order because the searching function can find the next Position without reliance on a specific order of the items in storage. In the preferred embodiment, the Position items are sorted in reading order and each item also has an index number. In this case, the client component stores in a register an addressing value that represents the index of the Position item that is currently being displayed, such that when the "next" command is input, the register is incremented and the desired Position item is immediately located based on that incremented index.

Exploring the changes in a summary view and clicking on a change in the summary view to locate that change in the redline document Having the changes highlighted in the redline document and clicking on the change in the redline document to locate the same change in the summary view Viewing the changes grouped by category in the summary view Viewing duplicated changes grouped together in the summary view (for instance if the same substitution—perhaps the change of a client name—is made in multiple places.

Comparison Actions:

As well as providing the user the ability to view the comparison document and summary as described above, the client UI component may allow the user to take the following actions—for each action the client UI will forward an appropriate request to the UI support server component which will orchestrate the execution of the action, returning any content relevant to the action to the client UI component.

Download the comparison document, possibly including a choice of download format such as DOCX, RTF, DOC or PDF Swap the order of the comparison documents Download either of the source comparison documents in its original format or in a specified format (by conversion)

Download the comparison document with changes converted to track changes for further editing in Microsoft Word® or other word processing software Save the comparison document to an online file storage site (ie Google Drive®, Dropbox®, iManage Work10™)

Document versions: In another embodiment, a version of the document may be compared with all of the other versions of the document, that is, the first and second documents may constitute a first version of the document and a series of second documents that are each an earlier version of the document. The output comparison may then include changes that are referenced to the different prior versions so that the evolution of the document may be apparent. In this embodiment, the data structure ChangeID may also include a pointers to the two first and second file versions being compared:

ChangeID[PositionNum(1) . . . PositionNum(n), Change Category(1) . . . Change Category(n), Change Type, data, pointer to file, prior text, following text, pointer to first file, pointer to second file]

As a result, on display, the scripts running in the browser UI may be able to display different changes based on which revision the change relates to. Furthermore, the script and UI may display in a dialogue box the set of "second files" in the set of ChangeID items received and take as an input selection which of the "second file" changes to display.

In yet another embodiment, the system may take as input through the UI a selection of a plurality of first files and a corresponding selection of a plurality of prior versions of the first plurality of files. In this embodiment, the comparison server will run these comparisons on all of the plurality of first files relative to the corresponding plurality of corresponding prior versions. This complex output may be stored in a database, where each ChangeID is a data record, or that the change data is represented in a series of relational tables. A data record representation may look like:

Record ID
   Source1
   Source2
   Type of change
   Changed text
   Location of changes Alternatively, the ChangeID may be used as a relational key, so that for each comparison, there is a set of tables with the ChangeID as the unique key for each change in a comparison. Storing the comparison data in this manner permits sophisticated relational query logic to be used to extract changes that will be displayed by the UI script engine operating in the browser window.

The system can also extract from each of the selected prior versions time stamps representing when the version was created and this data can also be stored in a relational table. As a result the user may submit a request through the UI that is converted into a database query that selects ranges of time to be used to determine which changes to display, either in a changed font color, underlining or some other kind of visually apparent indication in the text or document. Similarly, data representing the identity of the person who created a version of a document that is one of the selected plurality of prior versions can be stored in relational tables as well. The user can then select to display which changes across all or a selected set of the documents were made by a particular person. Of course, these change filtering queries can be stacked, so that a person's changes during a time frame may be selected.

In yet another embodiment, the database may be used to extract analytical data about how a predetermined set of document has been changed. For example, if Document A is changed by person X, and the database queries determine that each time that has happened, person X has changed Document B. This correlation can be detected by reviewing all of the change data stored in the database in order to determine which documents have correlations between their changes, based on time, person or version number. This result can then be encoded as an analytical rule. A number of these correlations can then be a set of rules. When Document A is changed again, the analytical rule set is then operated to determine what other changes are expected based on the action. In this non-limiting example, where another change to Document A is made by person X, the system can determine that an alert should be transmitted to person X to consider making a change to Document B. Similarly, it may be a new person Y makes a change to Document A, and the system automatically determines using the analytical rule that it should display to user Y text representing a suggestion to make a corresponding change to Document B because of the same rule.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, ACTIONSCRIPT, PHP, ECMASCRIPT, JAVASCRIPT, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system for displaying on remote client device a comparison generated on a server of a first and a second version of a document embodied as two respective data files comprising:
   a server comprised of a comparison engine component adapted by logic to generate a dynamic resource data, comprised of at least one comparison output data representing a corresponding at least one change between the first and second version of the document, and at least one corresponding data representing a change type associated with an operation of the corresponding at least one change and a change category associated with a purpose of the corresponding at least one change, the dynamic resource data generated using a predetermined comparison data organization scheme;
   a client device, comprised of a display, remotely connected to the server via a data network, the client device adapted by logic to display the dynamic resource data by:
      (i) using an application operating on the client device to load a static resource data usable for all comparisons being displayed by the application in order to control the appearance of the display of dynamic resource data received from the server on the client device in dependence on the loaded static resource data,
      (ii) receiving from the server the dynamic resource data,
      (iii) using the application to use the static resource data and dynamic resource data to present on the display the at least one data representing the corresponding at least one change between the first and second version of the document with a displayed visual indication of the corresponding change type, where the static resource data is used by the application to generate the displayed visual indication in dependence on the change type data comprising the dynamic resource data, and
      (iv) enabling the filtering on the display of one or more changes associated with at least one of a corresponding change type or a corresponding change category.

2. The system of claim 1 where the dynamic resource data is further comprised of at least one data item comprised of a change identifier corresponding to the corresponding at least one change.

3. The system of claim 2 where the dynamic resource data is further comprised of at least one data item that represents an at least one corresponding position of the corresponding at least one change.

4. The system of claim 1 where the comparison output data is a document file, and the document file is further comprised of the dynamic resource data.

5. The system of claim 1 where the dynamic resource data is comprised of data representing a change list comprised of at least one data item comprised of data representing the change type associated with the corresponding at least one change.

6. The system of claim 5 where the dynamic resource data is further comprised of a position list, comprised of at least one data item comprised of data representing an at least one position associated with the corresponding at least one change.

7. The system of claim 1 where the dynamic resource data is comprised of a change summary data, the change summary data comprised of data representing a change type of the corresponding at least one change.

8. The system of claim 7 where the change summary data is further comprised of data representing the change category corresponding to the corresponding at least one change.

9. The system of claim 7 where the change summary data is further comprised of data representing a change position corresponding to the corresponding at least one change.

10. The system of claim 1 where the static resource data are comprised of computer instructions configured to be interpreted by the application operating on the client device.

11. The system of claim 10 where the computer instructions are in the form of computer-readable code.

12. The system of claim 10 where the application is an Internet browser program.

13. The system of claim 12 where the computer instructions are downloaded and installed as a plug-in to the internet browser program.

14. The system of claim 10 where the computer instructions are downloaded, stored and installed on the client device as an enhancement to the application.

15. The system of claim 1 where the dynamic resource data are comprised of data representing an image of a portion of the document.

16. The system of claim 1 where the dynamic resource data are comprised of a data representing a portion of the document and is further comprised of at least one of: a comparison text corresponding to the at least one change or a position of the at least one change.

17. The system of claim 1 where the static resource data are comprised of data specific to the comparison output data further comprised of at least one of: display objects, font data, CSS or style sheet data.

18. The system of claim 1 where dynamic resource data is comprised of at least one change identifier uniquely associated with the at least one change.

19. The system of claim 1 where the comparison output data is comprised of a hypertext document, the hypertext document including at least one data element representing the corresponding at least one change.

20. The system of claim 19 wherein the at least one data element in the hypertext document representing the corresponding at least one change includes a corresponding at least one tag data associated with the corresponding at least one change that represents the corresponding change type.

21. The system of claim 20 where the client is further adapted by logic to use the static resource data in order to display the corresponding at least one change with a corresponding displayed visual indication representing the change type represented by the at least one tag.

22. The system of claim 19 where the at least one data element representing the corresponding at least one change is further comprised of a corresponding change identifier.

23. The system of claim 19 where the at least one data element is comprised of data representing a style designation associated with the corresponding at least one change that is associated with a change type.

24. The system of claim 1, where the server is further adapted by logic to transmit to the client device the static resource data, the dynamic resource data and the comparison output data in a single data file.

25. The system of claim 1 where the static resource data are comprised of at least one of: an HTML framework in which a comparison is displayed, a computer-readable code that when operated by the client device, requests and displays objects, CSS or other style sheet data.

26. The system of claim 1 where the client device is further adapted by logic to receive from a user operating the client device, a command to display an adjacent change in the dynamic resource data that is adjacent to an apparent location in the dynamic resource data of a change being displayed on the device, to use the dynamic resource data to locate the comparison output data representing the adjacent change and to use the located adjacent change data to redisplay the comparison output document at the apparent location of the adjacent change.

27. The system of claim 1 where the client device is further adapted by logic to receive a selection input data from a user operating the client device, and in response to such input selection data, cause the client device to display a portion of the comparison output data, the portion further comprised of highlighted text corresponding to the corresponding at least one change, the corresponding at least one change being associated with the selection data.

28. The system of claim 27 where the selection data is one of: data representing the change type, data representing the change category.

29. The system of claim 1 where the application is an Internet browser program.

* * * * *